(12) United States Patent
Roddy et al.

(10) Patent No.: US 6,750,419 B2
(45) Date of Patent: Jun. 15, 2004

(54) RESISTANCE WELDING ELECTRODE

(75) Inventors: Robert J. Roddy, Tecumseh (CA); Antonio D'Andrea, Windsor (CA)

(73) Assignee: Doben Limited, Ontario (CA)

( * ) Notice: Subject to any disclaimer, the term of this patent is extended or adjusted under 35 U.S.C. 154(b) by 0 days.

(21) Appl. No.: 10/266,233

(22) Filed: Oct. 8, 2002

(65) Prior Publication Data

US 2004/0065642 A1 Apr. 8, 2004

(51) Int. Cl.[7] .............................................. B23K 11/30
(52) U.S. Cl. ..................................... 219/119; 219/117.1
(58) Field of Search ............................. 219/119, 117.1, 219/83, 93

(56) References Cited

U.S. PATENT DOCUMENTS

| | | |
|---|---|---|
| 2,731,535 A | 1/1956 | Grey |
| 2,903,562 A | 9/1959 | Emmons et al. |
| 3,657,509 A | 4/1972 | Beneteau |
| 3,997,755 A * | 12/1976 | Moliner et al. ............. 219/120 |
| 4,020,316 A * | 4/1977 | Schaft et al. ................ 219/103 |
| 4,609,805 A * | 9/1986 | Tobita et al. .................. 219/93 |
| 5,285,044 A * | 2/1994 | Aoyama ........................ 219/93 |
| 5,471,029 A | 11/1995 | Simmons |
| 5,705,784 A | 1/1998 | Aoyama et al. |
| 6,008,463 A | 12/1999 | Aoyama et al. |
| 6,008,643 A * | 12/1999 | Mani et al. .................. 324/251 |
| 6,037,558 A * | 3/2000 | Geiermann et al. ...... 219/86.33 |
| 6,576,859 B2 * | 6/2003 | Cabanaw ..................... 219/119 |

* cited by examiner

Primary Examiner—Kiley Stoner
Assistant Examiner—Len Tran
(74) Attorney, Agent, or Firm—Carlson, Gaskey & Olds, P.C.

(57) ABSTRACT

A welding electrode for welding a fastener to an object is provided. The electrode includes a housing assembly with a bore disposed in the housing assembly. A pin is disposed within the bore and is movable along an axis between extended and depressed positions. The pin is retained in the bore by a flange on a lower portion of the pin that extends radially outwardly. A spring is arranged within the bore and urges the pin from the depressed position to the extended position in which a weld nut may be loaded onto the pin. The spring has a compressed length indicative of a spring failure. A stop such as a spring insulator is arranged within the bore adjacent to at least a portion of the spring. The stop extends generally longitudinally in the direction of the pin axis. The stop defines a maximum spring compression length in a fully depressed pin position that may be caused from an improperly loaded weld nut. The maximum spring compression length is greater than the compressed length so that the spring does not become compressed to the point of failure. The stop is preferably constructed from nylon and has a length sufficient to accommodate excessive forces on the stop caused by an improperly loaded weld nut.

17 Claims, 1 Drawing Sheet

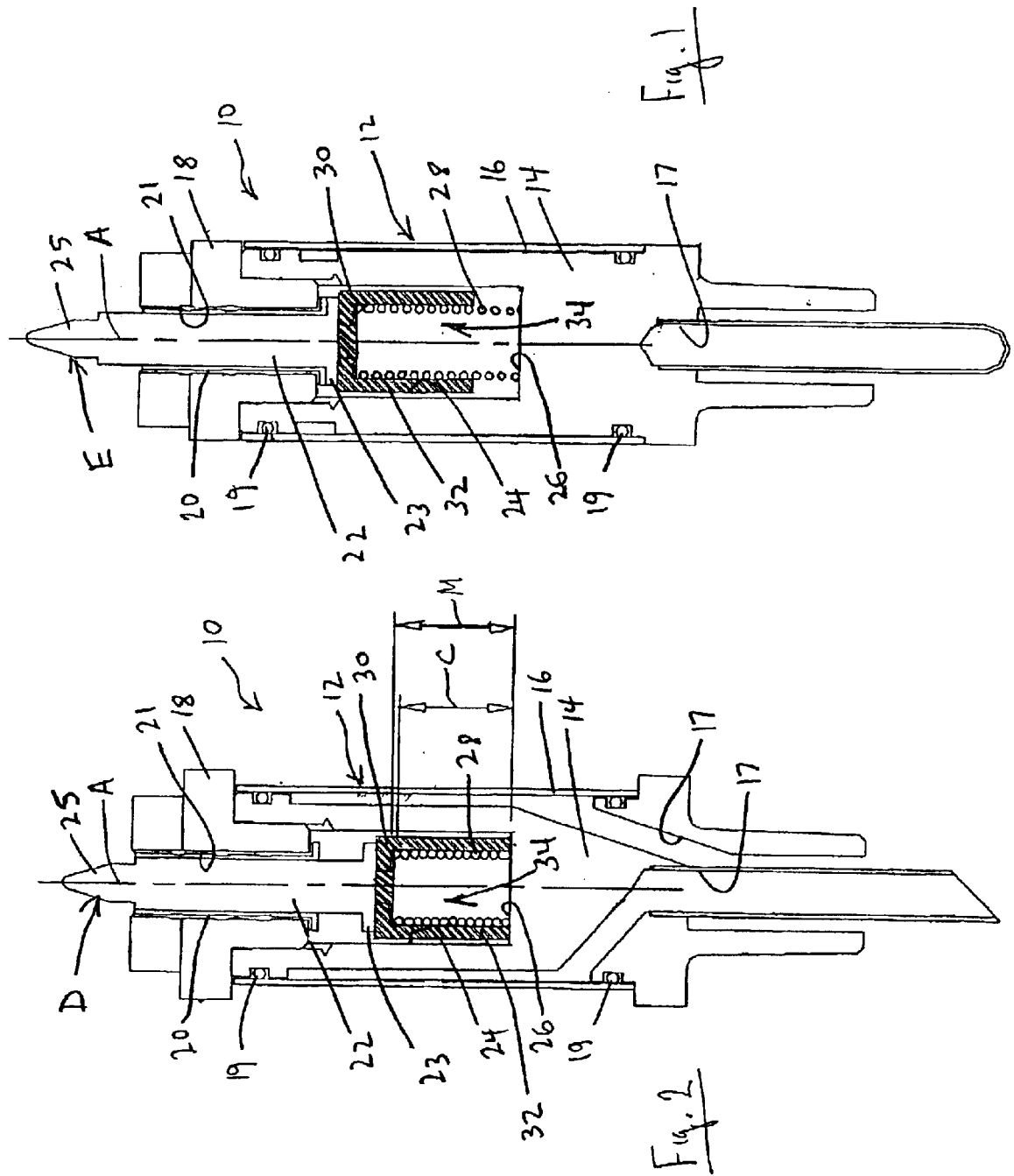

RESISTANCE WELDING ELECTRODE

BACKGROUND OF THE INVENTION

This invention relates to a resistance welding electrode for welding fasteners to a metallic object, and more particularly, the invention relates to an insulated stop for limiting electrode pin travel.

Weld gun assemblies are used to resistance weld fasteners to metallic objects such as body panels for vehicles. A fastener such as a weld stud or nut is loaded onto one of the electrodes. The electrodes are moved together with an actuator placing the fastener into engagement with the panel under pressure. Very high currents are applied to the electrodes, which welds the fastener to the panel. The use of weld guns is typically an automated process in which the fasteners are loaded into the weld gun assembly. Occasionally, the fastener is not properly loaded into the weld gun, which under, certain circumstances may cause damage to the electrode.

A widely used electrode in the industry utilizes a pin that receives a weld nut. The pin is biased to an extended position to receive the weld nut. The pin must be insulated from the electrode to prevent arching. If arching occurs, the surface of the pin could be damaged and prevent the unrestricted travel of the pin. Furthermore, a portion of the welding current will flow through the pin instead of the intended path through the nut and panel and the threads of the nut might be welded to the pin. Typically, a spring is employed in a bore in the electrode housing to bias the pin. During welding, the pin is moved to a depressed position in which the spring becomes compressed. If the weld nut is not properly loaded on the electrode, components of the electrode may become crushed or cracked. For example, if the weld nut was incorrectly loaded on the pin such that it was on top of the pin instead of being engaged on the pin with the pin extending through the weld nut hole, the opposing electrode will apply an excessive force to the electrode components. The pin may depress the spring to the point of failure and may also crack the spring insulator.

The pin must remain insulated from the electrode throughout the welding operation, even during improper operation of welding unit such as an improperly loaded pin. Because the dimensions of the electrode components have been standardized in the industry, it is not possible to lengthen the electrode body to accommodate features that would prevent excessive force from being applied to the spring and spring insulator. For example, modification to the pin or extensive modification to the electrode housing may not be possible. Therefore, what is needed is an improved resistance welding electrode that prevents damage to the spring and spring insulator due to excessive force from an improperly loaded weld nut.

SUMMARY OF THE INVENTION AND ADVANTAGES

The present invention provides a welding electrode for welding a fastener to an object. The electrode includes a housing assembly with a bore disposed in the housing assembly. A pin is disposed within the bore and is movable along an axis between extended and depressed positions. The pin is retained in the bore by a flange on a lower portion of the pin that extends radially outwardly. A spring is arranged within the bore and urges the pin from the depressed position to the extended position in which a weld nut may be loaded onto the pin. The spring has a compressed length indicative of a spring failure. A stop such as a spring insulator is arranged within the bore adjacent to at least a portion of the spring. The stop extends generally longitudinally in the direction of the pin axis. The stop defines a maximum spring compression length in a fully depressed pin position that may be caused from an improperly loaded weld nut. The maximum spring compression length is greater than the compressed length so that the spring does not become compressed to the point of failure. The stop is preferably constructed from nylon and has a length sufficient to accommodate excessive forces on the stop caused by an improperly loaded weld nut.

Accordingly, the above invention provides an improved resistance welding electrode that prevents damage to the spring and spring insulator due to excessive force from an improperly loaded weld nut.

BRIEF DESCRIPTION OF THE DRAWINGS

Other advantages of the present invention can be understood by reference to the following detailed description when considered in connection with the accompanying drawings wherein:

FIG. 1 is a cross-sectional view of the resistance welding electrode with the pin in an extended position; and FIG. 2 is a cross-sectional view of an electrode shown in FIG. 1 with the pin in a fully depressed position.

DETAILED DESCRIPTION OF THE PREFERRED EMBODIMENT

A resistance welding electrode 10 is shown in FIGS. 1 and 2. FIG. 1 depicts the electrode with the pin 22 in an extended position E ready to receive a weld nut. FIG. 2 depicts the electrode 10 in a fully depressed position D in which a weld nut may be improperly loaded on the pin 22, thereby producing undesirably high forces on the electrode components. For example, a portion of the weld nut may be on the top of the pin, as opposed to the aperture of the weld nut being centered on the pin 22, causing the components of the electrode 10 to be subjected to excessively high forces as the opposing electrode engages the weld nut.

The electrode 10 includes a housing assembly 12 having a body 14 with an outer sleeve 16 disposed about an outer portion of the body 14. The body 14 includes cooling passages 17 that are formed in the body 14 and between the body 14 and outer sleeve 16 for cooling the electrode as high currents are applied to the electrode generating heat. O-rings are arranged between the body 14 and the outer sleeve 16 to retain the cooling fluid within the housing assembly 12. The housing assembly 12 also includes a head 18 secured to the body 14 to retain the outer sleeve 16 on the body 14. Removal of the head 18 facilitates servicing of the internal components of the electrode 10.

The head 18 includes an aperture 21 receiving the pin 22. An insulated bushing 20 is arranged between the pin 22 and the head 18 to prevent the flow of current from the head 18 to the pin 22. The pin 22 has a tapered end 25 for receiving and guiding the weld nut onto the electrode 10 to a desired position in which the weld nut is properly located on the pin 22. However, the weld nut will occasionally improperly loaded on the pin 22, which may cause excessive forces to be exerted upon internal components of the electrode 10. A lower portion of the pin 22 extends into a bore 24 in the body 14. The pin 22 includes a flange 23 at the lower portion extending radially outwardly to retain the pin 22 within the housing assembly 12 when in the extended position E. The pin 22 is movable along a pin axis A from the fully extended position E, shown in FIG. 1, to a fully depressed D position shown in FIG. 2. A helical spring 28 is arranged in the bore 24 between a bottom portion 26 of the bore and the pin 22 for biasing the pin 22 from the depressed position D to the extended position E.

A stop is arranged between the pin 22 and the spring 28, preferably, the pin 22, spring 28, and stop 30 are co-axial about the pin axis A. The stop 30 is preferably constructed from a non-conductive material such as a polymer. Preferably, a polymer such as nylon is used. The stop 30 insulates the pin 22 from the rest of the electrode 10 to ensure that the electrode 10 does not short during the welding operation. Specifically, the pin 22 and weld nut are at one polarity and insulated by the bushing 20 and stop 30 while the housing assembly 12 and the spring 28 are at an opposite polarity during welding.

The stop 30 has an outer cylindrical wall 32 extending away from the pin 22 forming a cavity 34 at least partially receiving the spring 28. The stop 30 defines a maximum spring compression length M that is greater than the compressed length C of the spring 28 at which the spring would fail under excessive forces from the opposing electrode due to an improperly loaded weld nut. The stop 30 limits the travel of the pin 22 and prevents damage to the spring 28. Furthermore, the length of the outer wall 32 is sufficient to absorb the excessive force that may be applied to the stop 30 thereby preventing the stop 30 from cracking.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A welding electrode for welding a fastener to an object, the electrode comprising:
   a housing assembly with a bore disposed in said housing assembly;
   a pin disposed within said bore and movable along an axis between extended and depressed positions;
   a spring disposed within said bore urging said pin from said depressed position to said extended position, said spring having a compressed length indicative of spring failure; and
   a stop disposed within said bore and arranged adjacent and around to at least a portion of said spring and extending generally longitudinally in the direction of said axis, said stop defining a maximum spring compression length in a fully depressed pin position greater than said compressed length.

2. The electrode according to claim 1, wherein said pin includes a flange extending radially outwardly from a pin body with said flange retaining said pin within said housing assembly.

3. The electrode according to claim 1, wherein said stop is an insulator disposed between said pin and said spring with said insulator constructed from a nonconductive material.

4. The electrode according to claim 3, wherein said insulator includes an outer wall forming a cavity with said spring at least partially disposed within said cavity.

5. The electrode according to claim 4, wherein said spring is a helical spring coaxial with said pin axis.

6. The electrode according to claim 3, wherein said bore includes a bottom portion with said insulator engaging said bottom portion in said maximum depressed position.

7. The electrode according to claim 3, wherein said insulator is constructed from a polymer material.

8. The electrode according to claim 7, wherein said polymer is nylon.

9. The electrode according to claim 3, wherein said pin has a first polarity and said spring has a second polarity opposite said first polarity in said depressed position during welding.

10. A method of resistance welding fasteners comprising the steps of:
    a) providing a stop arranged longitudinally around at least a portion of a spring in a housing bore between a pin and a housing;
    b) defining a maximum spring compression length with the stop;
    c) depressing a spring arranged in the housing bore with the pin during welding, the spring having a compressed length corresponding to spring failure with the maximum spring compression length greater than the compressed length; and
    d) limiting the depression of the spring by the pin to the maximum spring compression length with the stop.

11. The method according to claim 10, wherein the stop is an insulator arranged between the pin and the spring.

12. The method according to claim 10, wherein in the pin and the stop are coaxial.

13. The method according to claim 10, wherein the spring and the stop are coaxial.

14. The electrode according to claim 1, wherein said stop moves along with said pin as said pin moves between said extended and depressed positions.

15. The electrode according to claim 2, wherein said stop is in engagement with said pin flange.

16. The electrode according to claim 6, wherein said insulator is spaced from said bottom portion in said extended position.

17. The method according to claim 10, wherein step (c) includes the pin moving between extended and depressed positions during welding with the stop moving with the pin when moving from the extended position to the depressed position, the spring reaching the maximum compression length in a fully depressed position.

* * * * *